US009738795B2

(12) United States Patent
Hao et al.

(10) Patent No.: US 9,738,795 B2
(45) Date of Patent: Aug. 22, 2017

(54) METHOD FOR IMPROVING SINGLE-WALL CARBON NANOTUBE DISPERSION

(71) Applicants: BEIJING AGLAIA TECHNOLOGY DEVELOPMENT CO., LTD., Beijing (CN); GUANGDONG AGLAIA OPTOELECTRONIC MATERIALS CO., LTD., Forshan, Guangdong (CN)

(72) Inventors: Haiyan Hao, Foshan (CN); Xiliang Cao, Foshan (CN); Lei Dai, Beijing (CN); Lifei Cai, Beijing (CN)

(73) Assignees: BEIJING AGLAIA TECHNOLOGY DEVELOPMENT CO., LTD., Beijing (CN); GUANGDONG AGLAIA OPTOELECTRONIC MATERIALS CO., LTD., Foshan (CN)

( * ) Notice: Subject to any disclaimer, the term of this patent is extended or adjusted under 35 U.S.C. 154(b) by 0 days.

(21) Appl. No.: 15/106,705

(22) PCT Filed: Nov. 28, 2014

(86) PCT No.: PCT/CN2014/092465
§ 371 (c)(1),
(2) Date: Jun. 20, 2016

(87) PCT Pub. No.: WO2015/096590
PCT Pub. Date: Jul. 2, 2015

(65) Prior Publication Data
US 2017/0029633 A1 Feb. 2, 2017

(30) Foreign Application Priority Data
Dec. 23, 2013 (CN) .......................... 2013 1 0716719

(51) Int. Cl.
H01B 1/04 (2006.01)
C09D 5/24 (2006.01)
(Continued)

(52) U.S. Cl.
CPC ............ *C09D 5/24* (2013.01); *C01B 31/0273* (2013.01); *H01B 1/04* (2013.01); *B82Y 30/00* (2013.01);
(Continued)

(58) Field of Classification Search
CPC ..... B82Y 30/00; B82Y 40/00; C01B 2202/02; C01B 31/0273; C09D 5/24; H01B 1/04;
(Continued)

(56) References Cited

U.S. PATENT DOCUMENTS 7,535,462 B2 * 5/2009 Spath ...................... G06F 3/045
345/174
2004/0038251 A1 * 2/2004 Smalley ................. B82Y 15/00
435/6.11

(Continued)

FOREIGN PATENT DOCUMENTS

CN 101049926 A 10/2007
CN 101485962 A 7/2009
(Continued)

Primary Examiner — Mark Kopec
Assistant Examiner — Jaison Thomas
(74) Attorney, Agent, or Firm — Maschoff Brennan

(57) ABSTRACT

Provided is a method for improving single-wall carbon nanotube dispersion, comprising the following steps: (1) using ultrasonic waves to disperse single-wall carbon nanotube powder in a lipid solvent, and allowing to stand for 2-3 days for swelling and centrifuging; (2) successively washing by centrifugation with low-boiling point alcohol solvent and water, then drying; (3) adding the dried single-wall carbon nanotubes to a strongly oxidative acid solution for oxidation, and centrifuging; (4) washing by centrifugation with water to a centrate of pH7, then dissolving the single-wall carbon nanotubes in water or alcohol solvent. Upon processing by the described method, recovery of single-wall carbon nanotubes is around 80% or higher, and the single-wall carbon nanotube solution is highly concentrated; the absorbance (Continued)

value of the carbon nanotube dispersion can be reduced to approximately 1600, and the invention can be used for preparation of flexible transparent electrode materials.

7 Claims, 1 Drawing Sheet

(51) Int. Cl.
 *C01B 31/02* (2006.01)
 *B82Y 40/00* (2011.01)
 *B82Y 30/00* (2011.01)
(52) U.S. Cl.
 CPC .......... *B82Y 40/00* (2013.01); *C01B 2202/02* (2013.01); *Y10S 977/75* (2013.01); *Y10S 977/842* (2013.01); *Y10S 977/932* (2013.01)
(58) Field of Classification Search
 CPC . Y10S 977/75; Y10S 977/842; Y10S 977/932
 See application file for complete search history.

(56) References Cited

U.S. PATENT DOCUMENTS

| | | | | |
|---|---|---|---|---|
| 2005/0234263 A1* | 10/2005 | Prato | ...................... | B82Y 30/00 562/440 |
| 2006/0014375 A1* | 1/2006 | Ford | ...................... | B82Y 30/00 438/622 |
| 2006/0188723 A1* | 8/2006 | Rowley | .................. | B82Y 10/00 428/408 |
| 2006/0204427 A1* | 9/2006 | Ghenciu | ................ | B82Y 10/00 423/445 B |
| 2007/0292622 A1* | 12/2007 | Rowley | .................. | B82Y 10/00 427/407.1 |
| 2008/0152573 A1* | 6/2008 | Juni | ........................ | B01J 19/123 423/447.1 |
| 2009/0061194 A1* | 3/2009 | Green | .................... | B82Y 10/00 428/220 |
| 2010/0119822 A1* | 5/2010 | Hwang | .................. | B82Y 30/00 428/364 |
| 2010/0172818 A1* | 7/2010 | Lin | ........................ | B82Y 30/00 423/460 |
| 2010/0266838 A1* | 10/2010 | Lee | .......................... | H01B 1/22 428/323 |
| 2011/0048277 A1* | 3/2011 | Sivarajan | ............... | C09D 11/52 106/31.13 |
| 2011/0127472 A1* | 6/2011 | Sato | ........................ | B82Y 30/00 252/511 |
| 2011/0204281 A1* | 8/2011 | Rouse | .................... | B82Y 30/00 252/75 |
| 2011/0204300 A1* | 8/2011 | Kitano | ................... | B82Y 30/00 252/519.3 |
| 2013/0214210 A1* | 8/2013 | Hondo | .................... | C01B 31/02 252/502 |
| 2014/0060602 A1* | 3/2014 | Aoai | ...................... | B82Y 30/00 136/205 |

FOREIGN PATENT DOCUMENTS

| | | |
|---|---|---|
| CN | 101941690 A | 1/2011 |
| CN | 102424379 A | 4/2012 |
| WO | 2008/054472 A2 | 5/2008 |

\* cited by examiner

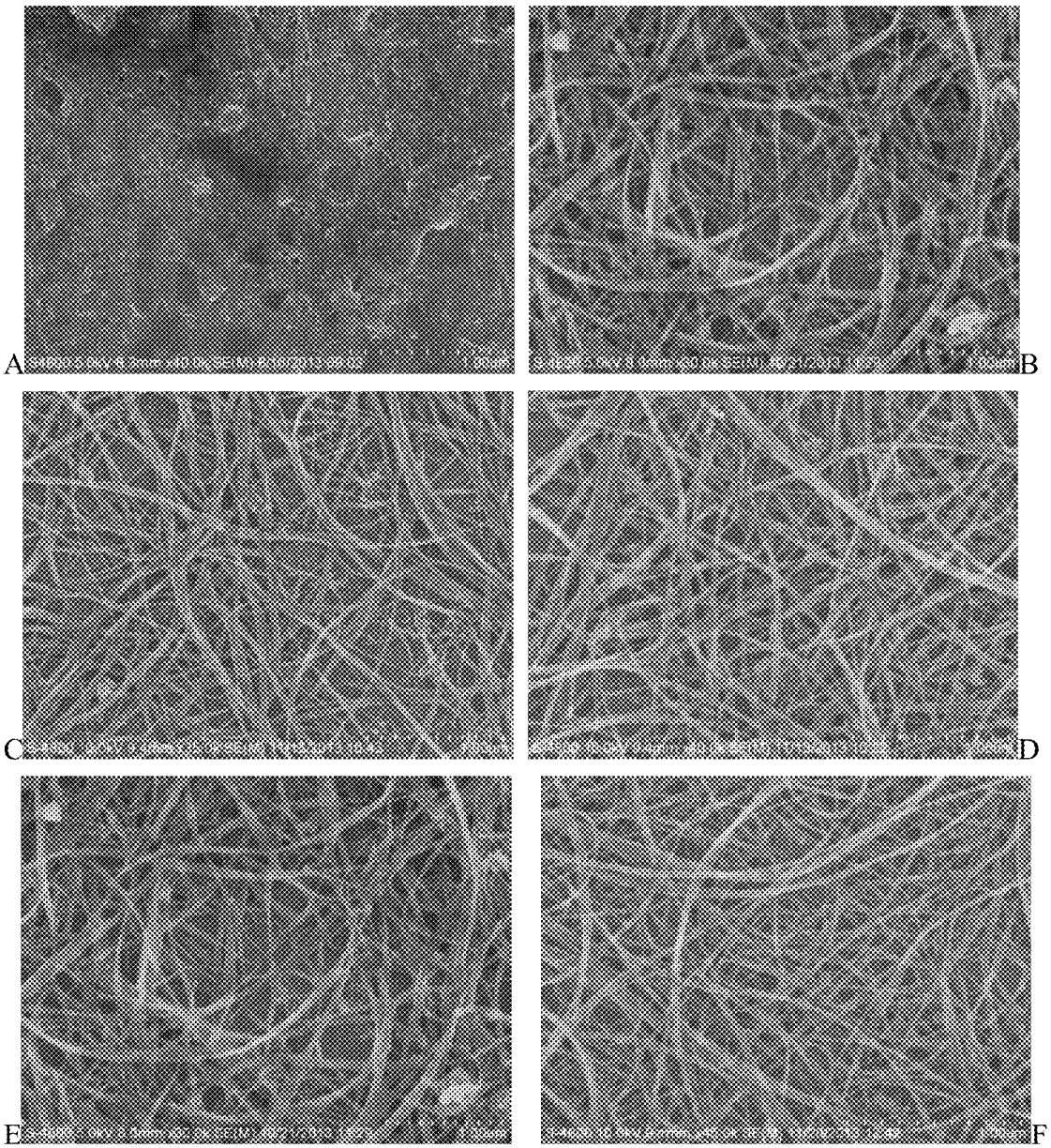

METHOD FOR IMPROVING SINGLE-WALL CARBON NANOTUBE DISPERSION

TECHNICAL FIELD

The invention relates to a reprocessing method of single-wall carbon nanotube, in particular, to a method for improving single-wall carbon nanotube dispersion.

BACKGROUND ART

The carbon nanotube is a carbon material with the feature of typical layered hollow structure, and the body of carbon nanotube is composed of a structural unit of hexagonal graphite carbon ring, which is a one-dimensional quantum material with special structure (nanometer scale in radial dimension, and micron dimension in axial dimension). Its tube wall is mainly composed of several layers to tens of layers of coaxial circular tubes, and there is a fixed distance of about 0.34 nm between layers; generally, its diameter is 2~20 nm. Its conjugative effect is obvious since P electron on the carbon atom on the carbon nanotube forms a wide range of delocalized $\pi$ bond; and it has excellent electrical properties for the structure of carbon nanotube is the same as the lamellar structure of graphite. The single-wall carbon nanotube material is regarded as a transparent electrode that can replace ITO especially by the research community and the industrial circle due to its high electronic mobility and low electrical resistivity. However, the strong van der waals force (~500 eV/μm) and great slenderness ratio (>1000) between single-wall carbon nanotubes is usually easy to form a big tube bundle, which is hard to disperse, so its excellent performance and practical use are restricted greatly.

For carbon nanotubes grown by CVD, a staggered network structure is formed between tube bundles. Generally, many amorphous carbons and graphite debris may cover on the surface of tube bundles of the single-wall carbon nanotube, and the end of carbon nanotube is connected with catalyst, etc. Impurities in the network will influence the performance of carbon nanotube. So, the purification and dispersion methods of carbon nanotube play a very critical role in its application and development.

Main techniques of purifying and dispersing the carbon nanotube through wet chemical method include non-covalent functionalization, covalent functionalization and solvent stripping. The common character of these main techniques is that they all need the aid of a greater mechanical force. For example: use high frequency ultrasound, ball milling, etc. to promote the dispersion of carbon nanotube, then remove big tube bundles by high speed centrifugal separation. But large mechanical forces will damage carbon nanotubes inevitably, so separation of big tube bundles by high speed centrifugation will cause loss of carbon nanotubes (dispersion of carbon nanotubes only depending on mechanical forces may have a poor effect: most of carbon nanotubes aggregate together, and in the process of centrifugation, they may aggregate again; while if using high speed separation to remove big tube bundles, most of carbon nanotubes will be centrifuged). Additionally, while using the above described method, it is necessary to add surfactants such as sodium dodecyl benzene sulfonate, octyl phenol macrogol ester, polyvinyl pyrrolidone in water or alcohol or other common solvents to help disperse the single-wall carbon nanotube. The amount of the used surfactants is large, some reach above 10% in concentration, but the concentration of single-wall carbon nanotubes that can be dispersed is still low. The membrane conductivity and the heat transfer property of single-wall carbon nanotube are poor due to the influence of large amount of surfactants in the dispersion liquid. The use of non-covalent functionalization may introduce additives that help disperse carbon nanotubes such as surfactants or polymers etc. which are difficult to remove completely, thus reducing the electrical and thermodynamic properties of the carbon nanotube network itself; the use of covalent functionalization will damage the sp2 structure of functional site of carbon nanotube; and for solvent stripping, solvents reported currently have a high boiling point, high toxicity and low dispersion efficiency. Therefore, while maintaining the structural integrity of carbon nanotube and without adding any additive, effective dispersion of carbon nanotubes in common solvents is still an important issue in the research and application of single-wall carbon nanotube.

The conductivity of single-wall carbon nanotube is the highest among carbon nanotubes. But, the single-wall carbon nanotube is the most difficult one to be dispersed in various solvents. At present, water or alcohol with low boiling point (such as methanol, 2-propanol) is usually used as the dispersion solvent. However, such solvents are poor to wet and disperse single-wall carbon nanotubes. Comparing with such solvents, organic solvents such as tetrahydrofuran, dimethylformamide are slightly better in dispersion. But, the toxicity of tetrahydrofuran is high, and the boiling point of dimethylformamide is too high. The concentration of the dispersion liquid of carbon nanotube prepared by the method for dispersing single-wall carbon nanotubes by a single solvent is very low, so it is necessary to preprocess the single-wall carbon nanotubes before dispersion by conventional solvents, so as to improve its dispersing performance.

SUMMARY OF THE INVENTION

Based on the application for the development of carbon nano composite transparent electrode material, the invention provides a method for improving the dispersion of single-wall carbon nanotube, with no need to add dispersing aids. Under the premise of the structural integrity of single-wall carbon nanotube, it can achieve the uniform dispersion of single-wall carbon nanotube in water or alcohol solvent.

Besides, the invention provides single-wall carbon nanotube that is easy to disperse obtained by this method; and ethanol or water dispersion liquid of this single-wall carbon nanotube is used as raw material to develop carbon nanotube composite transparent electrode film material on the surface of PET film.

A method for improving the dispersion of single-wall carbon nanotube, comprising the following steps:

(1) Dispersing single-wall carbon nanotube powder in a lipid solvent, and allowing to stand for 2-3 days for swelling and centrifuging. The dispersion is to use ultrasonic wave to disperse for 30-60 minutes;

(2) Successively washing by centrifugation with low-boiling point alcohol solvent and water, then drying;

(3) Adding the dried single-wall carbon nanotubes to a strongly oxidative acid solution for oxidation, and centrifuging. Oxidizing condition: react for 3-4 hours at 100-130° C.;

(4) Washing by centrifugation with water to a centrate of pH 7, then dissolving the single-wall carbon nanotubes in water or alcohol solvent.

The lipid solvents are ethyl acetate, butyl acetate, amyl acetate, ethyl benzoate, and N,N-dimethylformamide (DMF).

The strongly oxidative acid solution is a single strong acid liquid or several strong acid liquids or strong acid liquid added with oxidizing agent.

The strongly oxidative acids are trifluoroacetic acid (TFA), concentrated nitric acid, concentrated sulfuric acid, mixed liquor of concentrated nitric acid and concentrated sulfuric acid, mixed liquor of concentrated nitric acid and hydrogen peroxide, mixed liquor of concentrated sulfuric acid and hydrogen peroxide, or mixed liquor of TFA and DMF.

The volume ratio of concentrated nitric acid to concentrated sulfuric acid in the mixed liquor of the concentrated nitric acid and concentrated sulfuric acid is 1:1, the volume ratio of concentrated nitric acid to hydrogen peroxide in the mixed liquor of concentrated nitric acid and hydrogen peroxide is 1:1, the volume ratio of concentrated sulfuric acid to hydrogen peroxide in the mixed liquor of concentrated sulfuric acid and hydrogen peroxide is 1:1, and the volume ratio of TFA to DMF in the mixed liquor of TFA and DMF is 1:9.

The alcohol solvent is ethanol or methanol.

The speed of centrifugation is generally controlled at 3000-5000 rpm. After low speed centrifugation, the carbon nanotube is relatively loose in structure.

Lipid solvent is used in the invention to fully swell the single-wall carbon nanotube, then achieve purification and dissolution of single-wall carbon nanotube in common solvent (water and alcohol solvent) through control of the method of acid oxidation of single-wall carbon nanotube.

The principle of the invention is based on carbonaceous byproducts and metal catalysts such as amorphous carbon, carbonaceous nano-particles and carbon fragments with high chemical activity and low crystallinity are usually contained on the surface of single-wall carbon nanotube or among single-wall carbon nanotubes, as shown in A in FIG. 1. Firstly, swell amorphous carbon on the surface of single-wall carbon nanotube with lipid solvent, so as to reduce the binding force between the aggregated amorphous carbons with higher surface activity. After centrifugal separation, carbon nanotube powder with higher dispersion of which the surface is covered with loose amorphous carbons is formed. Then oxidize the amorphous carbon with incomplete structure of crystalline state on the surface of single-wall carbon nanotube in acid with stronger oxidability through control of reaction condition to form COOH, so as to make the carbonaceous byproducts with higher activity adhered to the surface of carbon nanotube carboxylic, and then to make some dissoluble functional groups be grafted on the surface of single-wall carbon nanotube, thus realizing the solubility of single-wall carbon nanotube, and maintaining its structural integrity and electrical properties.

Specific techniques are as follows:

Step 1: Using ultrasonic wave to disperse single-wall carbon nanotube powder in a lipid solvent such as ethyl acetate, butyl acetate, amyl acetate, and ethyl benzoate. Then perform swelling for a long time.

Step 2: After dispersing the single-wall carbon nanotube evenly in the lipid solvent, separating it in a centrifuge to obtain single-wall carbon nanotube powder with loose structure, then drying it.

Step 3: Make carbon nanotube functional through control of the types of strong acidic materials and the reaction condition, and make the carbonaceous byproducts with higher activity adhered to the surface of carbon nanotube carboxylic, and then make functional groups be grafted on the surface of the integral carbon nanotube, thus realizing the solubility of single-wall carbon nanotube.

Step 4: Washing single-wall carbon nanotubes with higher dispersion by centrifugation, to obtain neutral carbon nanotube, which can be dispersed better in water or alcoholic solution.

The technique is simple in processing steps and it has a strong operability. But in Step 1 and Step 2, the time for swelling is different when using different lipid solvents, the action on amorphous carbon is also different when using different strong acids, and there will also be great differences in the solubility of the resulting single-wall carbon nanotube and the cleanliness of the carbon nanotube.

Lipid solvents used herein are ethyl acetate, butyl acetate, amyl acetate, ethyl benzoate, and N,N-dimethylformamide (DMF).

Strong acids used herein are trifluoroacetic acid (TFA), nitric acid, concentrated sulfuric acid, and hydrogen peroxide which are easy to dissolve and will not leave inorganic salt on the surface of carbon nanotube; or composite acids such as nitric acid and concentrated sulfuric acid, nitric acid and hydrogen peroxide, concentrated sulfuric acid and hydrogen peroxide, and TFA and DMF, etc.

The dispersion of single-wall carbon nanotube in the invention is improved greatly. Solvents easy to disperse include alcohols with low boiling point such as methanol and ethanol; water; N,N-dimethylformamide (DMF), etc. The concentration of the single-wall carbon nanotube solution prepared in the invention is high, and before and after the treatment, the recovery rate of carbon nanotube is higher, which is over 80%. The absorbance value of dispersion liquid of carbon nanotube is used to characterize the concentration of carbon nanotube. Generally, the absorbance value of carbon nanotube with poor dispersion is about 16000-17000; while the absorbance value of dispersion liquid of carbon nanotube designed in the invention can be reduced by 10 times, which is about 1600.

BRIEF DESCRIPTION OF THE DRAWINGS

FIG. 1 is pictures of SEM of single-wall carbon nanotube. Where: A is a single-wall carbon nanotube before treatment, B is a single-wall carbon nanotube after treatment according to embodiment 1, C is a single-wall carbon nanotube after treatment according to embodiment 2, D is a single-wall carbon nanotube after treatment according to embodiment 3, E is a single-wall carbon nanotube after treatment according to embodiment 4, and F is a single-wall carbon nanotube after treatment according to embodiment 5.

DETAILED DESCRIPTIONS OF THE PREFERRED EMBODIMENTS

The invention is further described in details in combination with the attached drawings as follows:

Embodiment 1

Take 0.05 g SWCNT (see A in FIG. 1 for pictures of SEM before dispersion) and add to 40 ml ethyl benzoate solvent, perform ultrasonic dispersion for 40 min, leave standstill for swelling for 2 days, then centrifuge, and perform centrifugal washing with ethanol and deionized water successively. Add SWCNT after swelling to 30 ml concentrated nitric acid, react for 4 hours at 120° C., take it out and then perform centrifugal washing for several times until the supernatant is basically clear and the centrifugal solution is nearly neutral. The single-wall carbon nanotube powder obtained through centrifugal separation can be dispersed again in water and alcohol solvents evenly. Refer to B in FIG. 1 for its scanning electron micrograph. Disperse the treated single-wall carbon nanotube in 20 ml of ethanol solution, and its absorbance value is 1962.

Embodiment 2

Take 0.05 g SWCNT and add to 40 ml ethyl benzoate solvent, perform ultrasonic dispersion for 60 min, leave standstill for swelling for 2 days, then centrifuge, and perform centrifugal washing with ethanol and deionized water successively. Add SWCNT after swelling to 30 ml mixed solution of $H_2SO_4$ and $H_2O_2$ (volume ratio of 1:1), react for 3 hours at 120° C., take it out and then perform centrifugal washing for several times until the supernatant is basically clear and the centrifugal solution is nearly neutral. The single-wall carbon nanotube powder obtained through centrifugal separation can be dispersed again in water and alcohol solvents evenly. Refer to C in FIG. 1 for its scanning electron micrograph. Disperse the treated single-wall carbon nanotube in 20 ml of ethanol solution and its absorbance value is 1657.

Embodiment 3

Take 0.05 g SWCNT and add to 40 ml ethyl benzoate solvent, perform ultrasonic dispersion for 60 min, leave standstill for swelling for 2 days, then centrifuge, and perform centrifugal washing with ethanol and deionized water successively. Add SWCNT after swelling to 30 ml trifluoroacetic acid, react for 3 hours at 80° C., take it out and then perform centrifugal washing for several times until the supernatant is basically clear and the centrifugal solution is nearly neutral. The single-wall carbon nanotube powder obtained through centrifugal separation can be dispersed again in water and alcohol solvents evenly. Refer to D in FIG. 1 for its scanning electron micrograph. Disperse the treated single-wall carbon nanotube in 20 ml of ethanol solution and its absorbance value is 2023.

Embodiment 4

Take 0.05 g SWCNT and add to 40 ml ethyl acetate solvent, perform ultrasonic dispersion for 60 min, leave standstill for swelling for 48 hours, then centrifuge, and perform centrifugal washing with ethanol and deionized water successively. Add SWCNT after swelling to 30 ml of mixed solution of $HNO_3$ and $H_2O_2$ (volume ratio of 1:1), react for 3 hours at 120° C., take it out and then perform centrifugal washing for several times until the supernatant is basically clear and the centrifugal solution is nearly neutral. The single-wall carbon nanotube powder obtained through centrifugal separation can be dispersed again in water and alcohol solvents evenly. Refer to E in FIG. 1 for its scanning electron micrograph. Disperse the treated single-wall carbon nanotube in 20 ml of ethanol solution and its absorbance value is 2542.

Embodiment 5

Take 0.05 g SWCNT and add to 40 ml DMF solvent, perform ultrasonic dispersion for 60 min, leave standstill for swelling for 48 hours, then centrifuge, and perform centrifugal washing with ethanol and deionized water successively. Add SWCNT after swelling to 30 ml of mixed solution of $HNO_3$ and $H_2SO_4$ (volume ratio of 1:1), react for 3 hours at 120° C., take it out and then perform centrifugal washing for several times until the supernatant is basically clear and the centrifugal solution is nearly neutral. The single-wall carbon nanotube powder obtained through centrifugal separation can be dispersed again in water and alcohol solvents evenly. Refer to F in FIG. 1 for its scanning electron micrograph. Disperse the treated single-wall carbon nanotube in 20 ml of ethanol solution and its absorbance value is 2663.

Embodiment 6

Add 10 ml PEDOT: PSS (poly (3,4-ethylenedioxythiophene): sodium polystyrene sulfonate water solution, commercially available, containing 1.8% PEDOT) to the dispersion liquid of carbon nanotube in Embodiment 1, and after ultrasonic dispersion, obtain the carbon nanotube ink solution. Use the ink solution to prepare a transparent conductive electrode film on the surface of PET film through spin coating process, with the rate controlled at 3000 rpm 40 s.

The transmittance of the prepared transparent electrode film is over 80% at the optical wavelength of 550 nm, and the sheet resistance is 100-150Ω/□.

Add the dispersion liquid of single-wall carbon nanotube with good dispersion prepared in the invention to a conductive polymer system as a conductive material, and under the condition of no surfactant being added, to prepare the high-performance carbon nano composite flexible transparent electrode material, with high transmittance and low sheet resistance.

The dispersion liquid of single-wall carbon nanotube with good dispersion prepared in the invention can be used as a carrier of nano-catalyst or other functional nano materials, to achieve its application in a special environment.

What is claimed is:

1. A method for improving the dispersion of single-wall carbon nanotube, comprising the following steps:
   (1) Using ultrasonic waves to disperse single-wall carbon nanotube powder in a lipid solvent for 30-60 minutes, and allowing to stand for 2-3 days for swelling and centrifuging;
   (2) Successively washing by centrifugation again with low-boiling point alcohol solvent and water, then drying;
   (3) Adding the dried single-wall carbon nanotubes to a strongly oxidative acid solution for oxidation, and centrifuging again, wherein the oxidation includes oxidizing for 3-4 hours at 100-130° C.; and
   (4) Washing by centrifugation again with water to a centrate of pH 7, then dissolving the single-wall carbon nanotubes in water or alcohol solvent.

2. The method according to claim 1, wherein the lipid solvents are selected from the group consisting of ethyl acetate, butyl acetate, amyl acetate, ethyl benzoate, and N,N-dimethylformamide (DMF).

3. The method according to claim 1, wherein the strongly oxidative acid solution is a single strong acid liquid or several strong acid liquids or strong acid liquid added with oxidizing agent.

4. The method according to claim 3, wherein the oxidizing strong acids are selected from the group consisting of trifluoroacetic acid (TFA), concentrated nitric acid, concentrated sulfuric acid, mixed liquor of concentrated nitric acid and concentrated sulfuric acid, mixed liquor of concentrated nitric acid and hydrogen peroxide, mixed liquor of concentrated sulfuric acid and hydrogen peroxide, and mixed liquor of TFA and DMF.

5. The method according to claim 4, wherein the volume ratio of concentrated nitric acid to concentrated sulfuric acid in the mixed liquor of the concentrated nitric acid and concentrated sulfuric acid is 1:1, the volume ratio of concentrated nitric acid to hydrogen peroxide in the mixed liquor of concentrated nitric acid and hydrogen peroxide is 1:1, the volume ratio of concentrated sulfuric acid to hydrogen peroxide in the mixed liquor of concentrated sulfuric acid and hydrogen peroxide is 1:1, and the volume ratio of TFA to DMF in the mixed liquor of TFA and DMF is 1:9.

6. The method according to claim 1, wherein the alcohol solvent is ethanol or methanol.

7. The method according to claim 1, wherein the speed of centrifugation is at 3000-5000 rpm.

* * * * *